United States Patent
Giles et al.

(10) Patent No.: US 7,613,777 B2
(45) Date of Patent: Nov. 3, 2009

(54) RAPIDLY OBTAINING A SUBSET OF MESSAGE DATA FROM A SERVER FOR FILTERING

(75) Inventors: Tadd H. Giles, Kirkland, WA (US); Paul K. Kromann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 10/797,994

(22) Filed: Mar. 11, 2004

(65) Prior Publication Data

US 2005/0223085 A1    Oct. 6, 2005

(51) Int. Cl.
G06F 15/16    (2006.01)
G06F 15/00    (2006.01)

(52) U.S. Cl. .................................... 709/206; 707/201

(58) Field of Classification Search ......... 709/206–207, 709/203; 707/201
See application file for complete search history.

(56) References Cited

U.S. PATENT DOCUMENTS

| | | | | |
|---|---|---|---|---|
| 5,951,636 A * | 9/1999 | Zerber | | 709/202 |
| 5,961,590 A * | 10/1999 | Mendez et al. | | 709/206 |
| 5,974,238 A * | 10/1999 | Chase, Jr. | | 709/248 |
| 5,999,932 A * | 12/1999 | Paul | | 707/10 |
| 6,052,709 A * | 4/2000 | Paul | | 709/202 |
| 6,052,735 A * | 4/2000 | Ulrich et al. | | 709/236 |
| 6,125,369 A * | 9/2000 | Wu et al. | | 707/201 |
| 6,134,582 A * | 10/2000 | Kennedy | | 709/206 |
| 6,141,664 A * | 10/2000 | Boothby | | 707/201 |
| 6,212,529 B1 * | 4/2001 | Boothby et al. | | 707/201 |
| 6,324,544 B1 * | 11/2001 | Alam et al. | | 707/201 |
| 6,330,618 B1 * | 12/2001 | Hawkins et al. | | 709/248 |
| 6,421,709 B1 * | 7/2002 | McCormick et al. | | 709/206 |
| 6,505,214 B1 * | 1/2003 | Sherman et al. | | 707/201 |
| 6,633,924 B1 * | 10/2003 | Wu et al. | | 719/328 |
| 6,636,897 B1 * | 10/2003 | Sherman et al. | | 709/248 |

(Continued)

FOREIGN PATENT DOCUMENTS

WO    WO 9922305 A1 *    5/1999

OTHER PUBLICATIONS

J. Myers, IETF RFC 1739, "Post Office Protocol—POP3", May 1996.*

(Continued)

*Primary Examiner*—William C Vaughn, Jr.
*Assistant Examiner*—Shirley X Zhang
(74) *Attorney, Agent, or Firm*—Workman Nydegger (57) ABSTRACT

Described is a system and method in which client-side tracking mechanisms allow a computing device to efficiently decide which messages need to be downloaded from a server for subsequent filtering evaluation, and request only those messages. For example, the present invention may be used to limit a download of POP3 email messages to those received in the last n days. When a message is downloaded that does not meet user-specified filtering criteria such as a date window, the message data is discarded, but the state of that message as not meeting the criteria is preserved in an already-checked table. On a subsequent data request, the received list of unique message IDs is checked against the main message store and the checked table, and message data only downloaded if the unique ID is not found. Messages that are not listed are removed from the message store or the checked table.

9 Claims, 4 Drawing Sheets

U.S. PATENT DOCUMENTS

| | | | |
|---|---|---|---|
| 6,647,409 B1 | 11/2003 | Sherman et al. | |
| 6,654,787 B1 * | 11/2003 | Aronson et al. | 709/206 |
| 6,711,609 B2 * | 3/2004 | Boyer et al. | 709/206 |
| 6,725,239 B2 * | 4/2004 | Sherman et al. | 707/201 |
| 6,732,149 B1 * | 5/2004 | Kephart | 709/206 |
| 7,039,678 B1 * | 5/2006 | Halahmi et al. | 709/206 |
| 7,194,510 B2 * | 3/2007 | Sherman et al. | 709/203 |
| 7,209,949 B2 * | 4/2007 | Mousseau et al. | 709/206 |
| 7,243,163 B1 * | 7/2007 | Friend et al. | 709/248 |
| 7,290,034 B2 * | 10/2007 | Budd et al. | 709/206 |
| 2001/0054115 A1 | 12/2001 | Ferguson et al. | |
| 2003/0172118 A1 * | 9/2003 | Bilansky et al. | 709/206 |

OTHER PUBLICATIONS

European Search Report of Jul. 7, 2005 in EP application No. 05 10 1911 corresponding to US application.

* cited by examiner

RAPIDLY OBTAINING A SUBSET OF MESSAGE DATA FROM A SERVER FOR FILTERING

FIELD OF THE INVENTION

The invention relates generally to computing devices that receive data, particularly mobile computing devices including computers and mobile telephones.

BACKGROUND

Mobile computing devices such as personal digital assistants, contemporary mobile telephones, hand-held and pocket-sized computers, tablet personal computers and the like are becoming important and popular user tools. In general, they have become small enough to be extremely convenient, while consuming less battery power, and at the same time have become capable of running more powerful applications.

Via a remote connection, various messages such as email messages can be sent and received. Other types of messages that may be sent and received include Short Message Service (SMS) messages, a standard for sending short alpha-numeric messages (maximum 160 characters) to or from mobile phones in mobile communications networks. Such devices are able to store their received and other user data locally and/or by connecting to networks, including the Internet. In general, these computers and computer-based mobile telephones (such as those running Microsoft Windows® Mobile software for Smartphones) allow users to make conventional mobile telephone calls, access the Internet, send and receive messages including attachments, store contacts, maintain appointments and do many other things contemporary desktop computers can now do.

However, mobile devices have limited resources, including storage and bandwidth. As a result, certain types of server data are not feasible to download and maintain in their entirety. By way of example, consider the POP3 protocol used with email messages. If a user wants to have only some subset of those messages loaded into the device instead of the full set in order to save memory, such as only those messages received within the last three days, it is necessary for the device to evaluate the messages and discard the unwanted ones. This is because the POP3 protocol does not provide a command which allows an e-mail client to tell an incoming mail server to limit the download of email messages. However, if a user has a lot of such messages, regularly downloading the message data for filtering purposes is exasperating because of the limited bandwidth. For example, to determine the date of a POP3 message, data on the order of two kilobytes of data is downloaded for that message; if, as with many users, there are thousands of messages that each need to be processed for such filtering, data on the order of millions of bytes needs to be downloaded, which takes a considerable amount of time. In fact, with this type of filtering, a partial download might take as long as a full download. What is needed is a way for devices to efficiently download a subset of data from servers for filtering, when the filtering needs to be done at the client side, e.g., the communication protocol is not configured for communicating filtering information to the servers.

SUMMARY OF THE INVENTION

Briefly, the present invention is directed towards a system and method in which client-side tracking mechanisms allow a computing device to efficiently decide which messages need to be downloaded from a server for filtering purposes, and request only those messages. In one aspect, the present invention essentially performs most of the filtering operations before any message data is downloaded. For example, the present invention may be used to limit a download of POP3 email messages to those received in the last n days, but do so in an efficient manner that is orders of magnitude faster than current filtering operations.

To this end, when a message is downloaded that does not meet user-specified filtering criteria, e.g., is outside a desired time (date) window, the message data is discarded, but the state of that message as not meeting the criteria is preserved in an "already-checked" (or simply "checked") table, based on its unique identifier (ID). On a subsequent data request, (e.g., a send/receive request of an inbox application program to a POP3 server), a list of unique message IDs is acquired. Before requesting download of any message data from a server, the main message store and the checked table are evaluated, and only if the unique ID is not in either store is the message data downloaded.

In order to stay synchronized with the server, and also to keep the checked table from ever-expanding, each item that was deleted at the server has its record removed from the checked table. To this end, a flag is associated with each message record in the checked table and is set prior to comparing the list of unique message IDs. Taking each message ID in the list, if that message ID is listed and is also in the checked table, the flag for that message is cleared. Upon completion of processing the list, any message flag that is still set in a record in the checked table corresponds to a message that was not listed by the server, and therefore has been deleted at the server. The record for each such message is removed from the checked table.

Other advantages will become apparent from the following detailed description when taken in conjunction with the drawings, in which:

DETAILED DESCRIPTION

Exemplary Operating Environment

Figure 1:
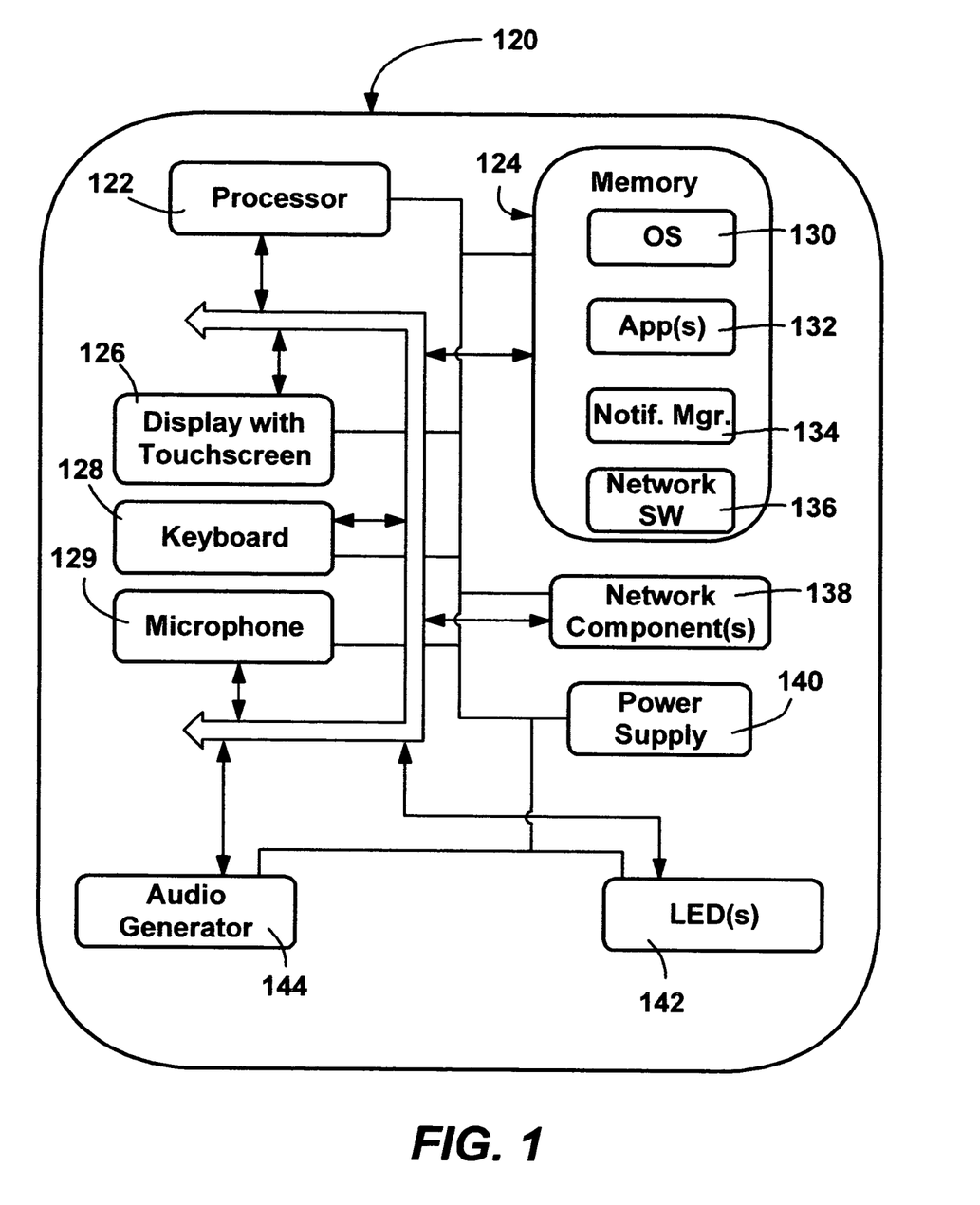
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Obtaining a Subset of Message Data for Filtering

The present invention is generally directed towards handling messages and similar data communications, such as email messages, particularly on small mobile computing devices including mobile telephones. As will be understood, however, the present invention is not limited to any type of computing device, and may, for example, be used with relatively large, stationary computing devices. Moreover, although the present invention will be generally described in terms of email applications and messages, it will be understood that the present invention is not limited to any particular applications or types of data, as other applications that download data can benefit from the present invention. Further, the present invention will be primarily described in terms of filtering based on a time window (e.g., one day, two days, and so on in one day increments), however virtually any criteria that is sensible for a given set of data will be equivalent. Note that as used herein, the plural "criteria" is intended to cover a single criterion as well as any combination of criteria.

Figure 2:
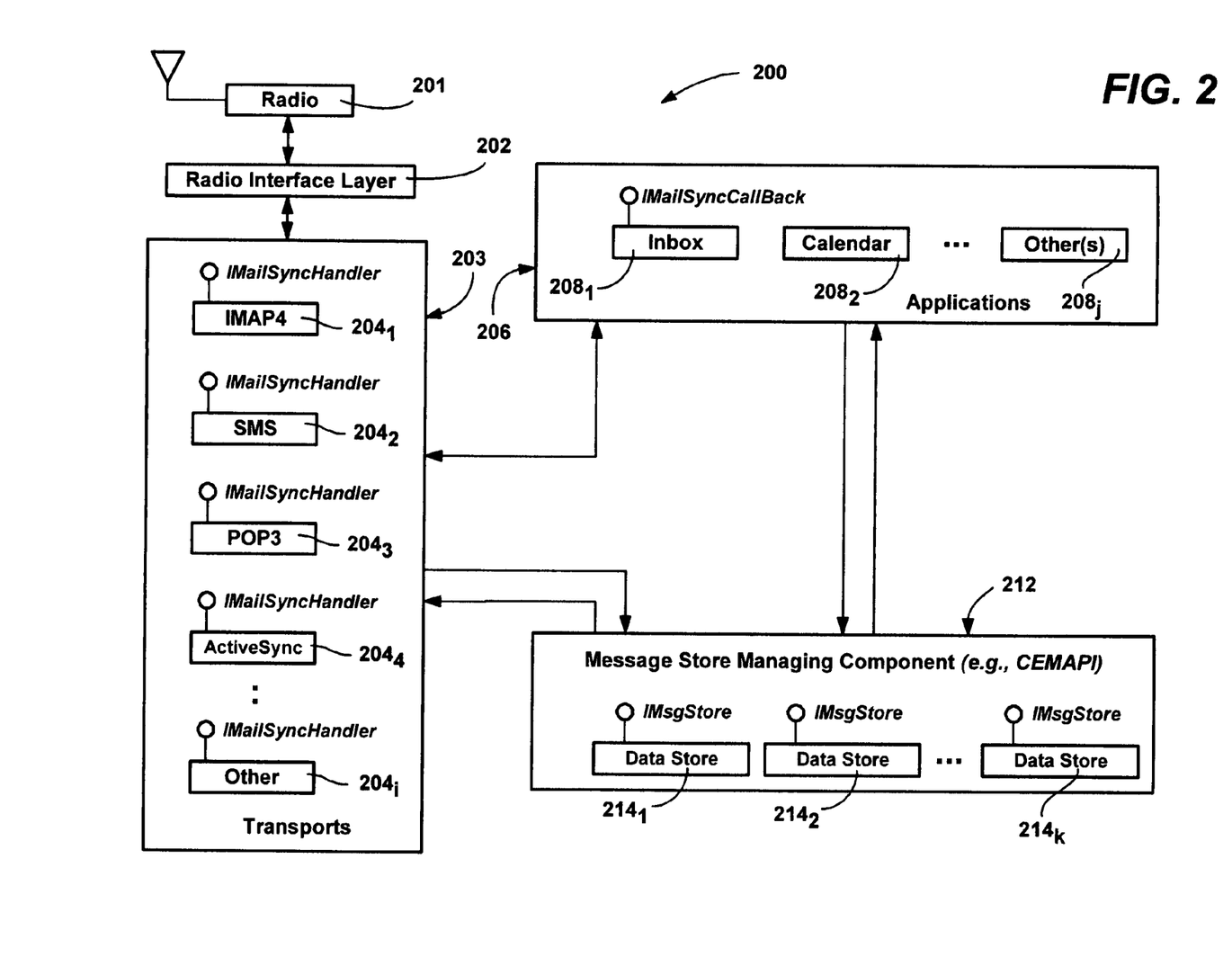
FIG. 2 is a block diagram representing a communications handling architecture into which the present invention may be incorporated.

Turning to FIG. 2, there is shown an architecture, generally designated 200, for handling mail-related messages and the like. One such architecture 200 is currently implemented in devices running Windows® for Mobile Devices. In this example architecture, a radio 201 receives communications and a radio interface layer 202 provides access to the received data. A number of transports 203 are provided, with each transport $204_1$-$204_t$ configured to receive (and transmit) different types of messages, e.g., IMAP4 (Internet Message Access Protocol version 4), SMS, POP3 (Post Office Protocol version 3), Active Sync (which supports synchronizing data between a Windows®-based desktop computer or an exchange server and Microsoft Windows® CE .NET-based portable devices), and others. Such others may include IM (Instant Messaging), MMS (Multimedia Messaging Service) and the like.

In general, application programs 206 are running on the mobile device, including applications that send and receive communications. Such application programs may include an inbox application $208_1$, a calendar application $208_2$ and others $208_j$, such as a contacts-related application program. In accordance with an aspect of the present invention and as described below with reference to FIGS. 3 and 4, one or more of these applications $208_1$-$208j$ may be configured to allow users to enter filtering criteria, whereby only those messages that meet the criteria will be maintained in a portable data store $214_1$-$214_k$. Note that the data stores do not necessarily correspond to an application program; for example, the inbox application $208_1$ may have multiple data stores maintained for it, e.g., one for IMAP4 messages, one for POP3 messages, and so on.

A message store managing component 212 (e.g., CEMAPI) such as implemented in an API allows applications such as the inbox application $208_1$ to store messages and retrieve stored messages as desired. In general, the message store managing component 212 abstracts the storage from applications such as the inbox application $208_1$, such that in essence the application only knows that message data exists somewhere, and that the data can be accessed via the message store managing component 212. Note that another such program that can receive data from a data store is an operating system component, and as such, any such computer program code should be considered equivalent for purposes of the present invention.

It should be noted that rather than providing the storage, although more complex, it is essentially equivalent to have an alternative implementation in which the inbox program works directly with the storage. Thus, as used herein, the term "message-handling mechanism" will be used to refer to the inbox application or the like and/or the message storing component, and may also include the concept of a transport, where appropriate.

In one implementation, the message stores $214_1$-$214j$ are COM (Component Object Model) objects associated with each inbox application service, and the message store managing component 212 provides access to these message stores via an IMsgStore interface. In this implementation, the message store libraries provide the IMsgStore interface, which provides access to unique, transport-specific storage. For example, the Inbox may store SMS messages in one message store, IMAP4 messages in another, and so on. The IMsgStore::GetProps and IMsgStore::SetProps methods accessed through each messages store's IMsgStore interface are used to access custom properties of the store.

Figure 3:
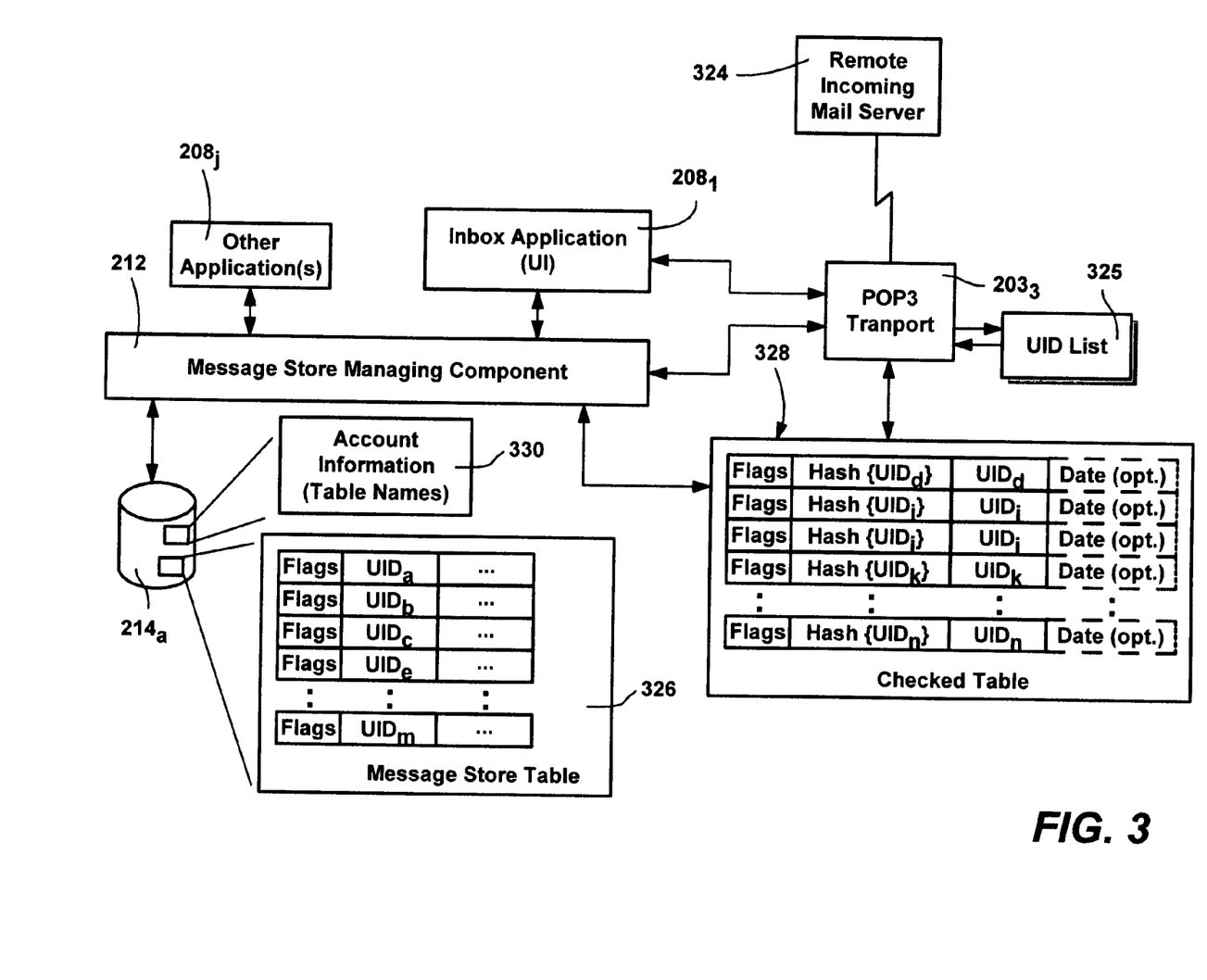
FIG. 3 is a block diagram representing various components and tracking tables used to determine which messages need to be downloaded for filtering, in accordance with an aspect of the present invention.

In accordance with an aspect of the present invention, FIG. 3 shows how tables of records are used to track the state of an inbox application program's messages, such that the state of any previously-downloaded messages with respect to current filtering criteria is known, and whereby only those messages that are in an unknown state need to have their data downloaded. In general, at an appropriate time, such as corresponding to an inbox application program's send/receive request, a list of every message ID maintained at a server is obtained. For example, in a POP3 environment, a UIDL (unique identifier listing) command is issued to obtain the list, and the request received at the POP3 server, e.g., an incoming mail server 324, which may be a combination of more than one computing device. In response, the mail server 324 returns the list 325. As described below, the POP3 transport $203_3$ processes the contents of this list against a message store table 326 and checked table 328. Because there may be multiple message stores, account information 330 is used to locate the table names and proper data store for this POP3 account. The first time the list is returned to a requesting device, the tables will be empty, and thus each listed message will need to have its data downloaded for evaluation against the filtering criteria, with those messages that meet the criteria being placed in the message store $214_a$. A record is created in the message store table 326 for each saved message.

In keeping with the present invention, the message data that does not meet the filtering criteria is discarded, however the known state of that message (as not meeting the filtering criteria) is stored in a corresponding record in the checked table 328. Note that in one implementation, the record is indexed by a hash of the unique message ID, (or UID in FIG. 3), for more efficient lookup. The unique ID also may be kept in the record for that message, and would be needed if the hash value was not guaranteed to be unique.

As is understood, the next time a send/receive synchronization request is made via the inbox application program $208_1$ resulting in a UIDL command being issued, when the server returns the new list 325, only those listed messages that are not in the message store table 326 or the checked table 328 are in an unknown state with respect to the current filtering criteria. Note that this assumes that the filtering criteria did not change since the last request, (which is handled in another manner, as described below).

Thus, after the device connects and logs on to receive the UIDL command results, that is, the list 325, logic (further described below with reference to FIG. 4) compares the listed UIDs with those in the message store table 326 or in the checked table 328, and downloads only those messages that are "new" and thus not listed in one of the tables 326 or 328. In one implementation, the logic is implemented in the POP3 transport $203_3$, however as can be readily appreciated, the logic may be elsewhere, such as in the inbox application and/or the message store managing component 212. In fact, in one implementation, the inbox application $208_1$ includes a POP3 transport component.

When the message data is received for those new messages, the logic evaluates the message data against the filtering criteria and if met, adds the message to the message store $214_a$ and creates a record for it in the message store table 326. If the filtering criteria is not met, the logic adds the unique ID (which may be a hashed value or in addition to a hashed value, as described above) to the checked table 328, and discards the message data. The state of each new message is thus preserved for the next evaluation, which will occur the next time that a send/receive request is received.

Further, for any message that was deleted at the server, a mechanism removes its corresponding record from the checked table or from the message store (along with removing any corresponding message data). Note that a message in the message store that is deleted at the server may be moved to a deleted items folder or the like, in which case the record may be kept but modified, however this can be considered essentially a "removal" and is generally unrelated to the present invention. The removal is so the tables on the client device stay synchronized with the server state, and also so that the tables do not contain irrelevant records.

To handle deletions at the server, each message record is marked before comparing the message records against the UIDs in the UID list 325, and message records that remain marked after the comparisons are completed are removed. More particularly, in one implementation, a flag is associated with each message record, and the flag is set prior to comparing the list of unique message IDs against the table. Taking each message ID in the list, if that message ID is listed and is also in a table, the message is unmarked, e.g., by clearing the flag for that message. Upon completion of processing the list, any message flag that is still set in a record in a table corresponds to a message that was not listed by the server, and therefore has been deleted at the server. The record for each such message is removed from the appropriate table. Note that the removal process needs to be performed after each UID has been evaluated, and thus unless the removal is done prior to any message downloading, any new record created in a table following downloading of a message should be put in unmarked.

By way of example, consider a user that only wants to receive and maintain the messages that are dated within zero to three days. Assuming that this was the filtering criteria at the time of the prior send/receive command, the tables will contain relevant state data. Upon receiving the UID list following a UIDL command, for each UID the tables are checked. Often, particularly for users that frequently synchronize via send/receive commands, most (or possibly all) of the messages are in one of the tables, and thus relatively little downloading is necessary. Since the table comparison is extremely fast relative to a download time, avoiding most downloads is highly efficient. For downloading, any UID that exists in the list but not in the message store table 326 or the checked table 328 is a new message that is on the server, and thus not known to the client device. Thus, this message (e.g., at least two kilobytes of related data) is downloaded, and its date is evaluated, which is against the three-day filtering criteria in this example. If within the three-day window, the message is added to the message store table 326, otherwise the data is discarded. However, in either case, a record is added to the appropriate table as described above.

As can be readily appreciated, other criteria can be used. For example, the present invention can filter out messages that do not come from a certain source, such as an employer. In such an example, a user can have only work-related messages on a handheld device used only at work; note that the messages are filtered at the device, not the server, and thus the user can obtain these other, non-work-related messages via another computer (or by changing the filtering criteria). Essentially, any data that can be evaluated can be used as filtering criteria, although for purposes of simplicity the description herein will return to date-based examples.

In another aspect, a user may want his or her inbox to automatically delete messages that are too old. Note that this may not be a deletion at the server, but only on the client device, such as to save memory space. Further, the deletion may or may not correspond to the filtering window, e.g., a user may want to only receive messages that are three days old or less, but may want messages automatically deleted when five-days old. In any event, when dealing with date-based filtering, upon deletion of a message from the client device but not actual deletion from the server, the automatic delete process should add a record to the checked table as it removes the record from the message store table, so that the message data for this message need not be downloaded again. Note, however, that if the user sets the automatic delete time to less than the date filtering time (if the system allows this), the presence of the record in the checked table 328 prevents automatically-deleted messages that would otherwise fall within the date window from being downloaded. For example, if a user sets messages to be automatically deleted after two days, when the date window is three days, the user would not be able to get back an automatically-deleted message without taking some action to prevent the filtering. Thus, the mechanism may be made user-configurable as to whether an automatically-deleted message that is still within the filtering window should be again downloaded, in which case the record should be removed from (or never added to) the checked table 328 for each such message.

As mentioned above, the checked table 328 may contain invalid data when the user changes the criteria. For example, if a user decides that the filtering criteria should be a five-day window instead of three days, there is a problem because a four and five day old messages in the checked table are now being requested by the user, but the checked table will block their downloading. Note that if a user changes the criteria in the other direction, this is not a problem, e.g., if changing the criteria from six days to two days, the checked table will maintain the data for messages that are older than six days, and thus the cache data is incomplete, but still valid. On the next send/receive, during filtering, the checked table will have records added to it, e.g., for three, four and five day old messages that will be filtered out.

In one implementation, when the cache table contains invalid data (e.g., the new date window is larger than the old), the entire cache is invalidated, such as by removing all of the records from it. This causes a download for every record, however the cache will thereafter be valid, and can be used unless and until the next time the user increases the date window.

Alternatively, a date field may be added to each record. With the date field, upon a change to an expanded date-filtering window, a process can examine each record and discard those records that do not fit within the new date window, whereby their message data will be downloaded following the next send/receive. Note that there is a tradeoff between memory space needed for the additional date field for each record versus download time. A user that rarely ever changed a date-filtering window would not want such a feature, whereas a user that frequently changed the date-filtering window would prefer not to have the checked table fully invalidated every time the window was expanded. Thus, such a date field may be provided in a manner that allows a user to switch it on (whereby the checked table could be recopied to a different table that has space for the extra field) or off, or such a switch may be made automatic based on statistical history of how often a user changes the date-filtering window.

Although the present invention is primarily described with reference to mail data herein, other applications can benefit from the present invention. For example, calendar-related applications, contacts-related applications, and so on have data that can be downloaded and filtered. Thus, and in general, any application that has downloaded data that can be filtered can benefit from the present invention.

Figure 4:
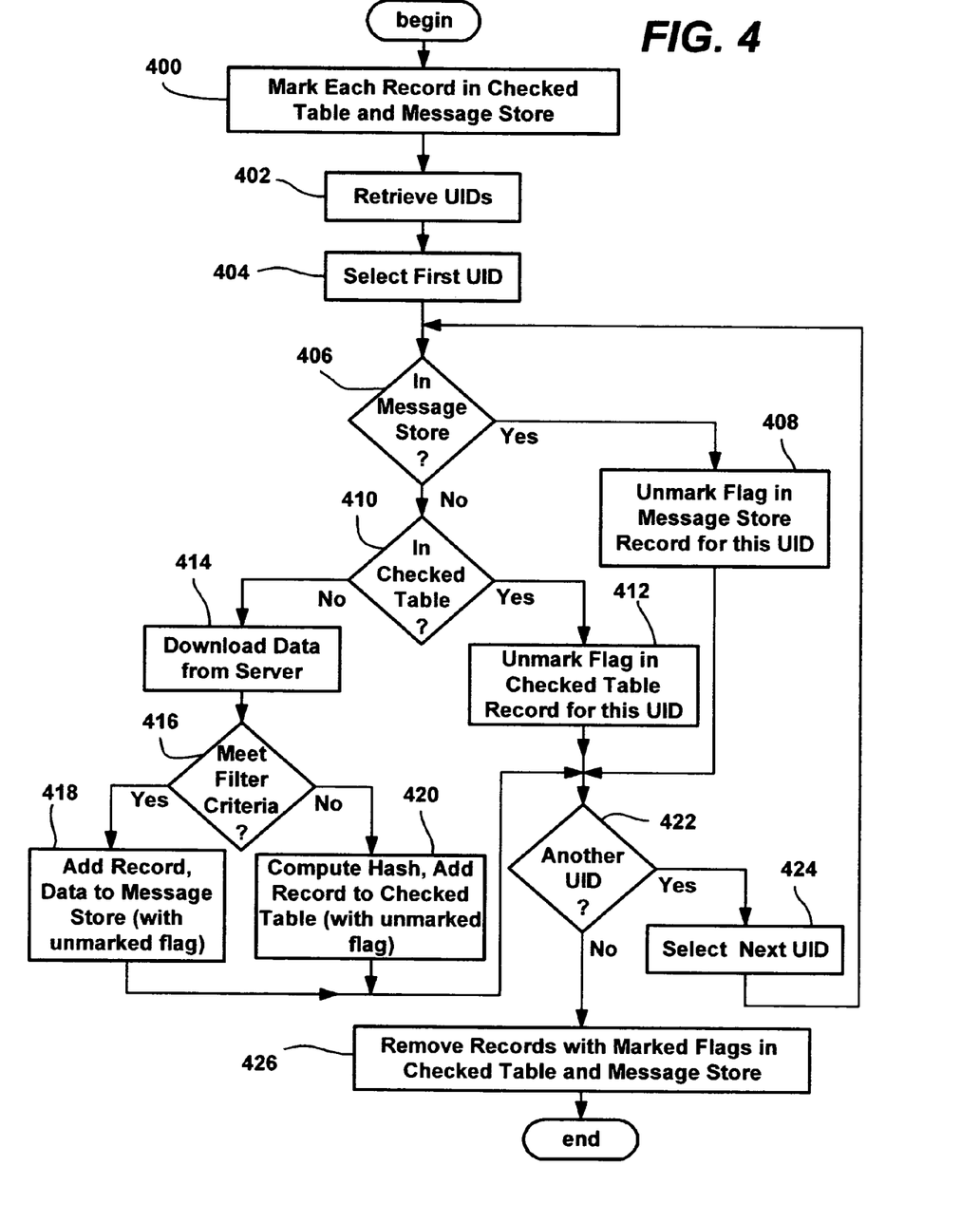
FIG. 4 is a flow diagram representing logic for processing message identifiers, table data and message data, in accordance with an aspect of the present invention.

Turning to an explanation of the operation of the present invention with particular reference to the flow diagram of FIG. 4, step 400 of FIG. 4 represents initializing the records (e.g., setting the flags) in the message store table 326 and checked table 328 so that those not listed by the server, and were thus deleted at the server, can be identified for removal. Note that as described below, steps 408 and 412 unmark such records when listed.

Step 402 represents retrieving the UIDs, such as via the UIDL command sent to a POP3 server. Step 402 also inherently represents the connect/logon operations. As described above, assuming no errors the UIDs are listed in the response from the server, and step 404 represents selecting one from the list 325.

Step 406 tests, via the message store table 326, whether that UID is in the message store; if so the message is present and need not be downloaded, and thus step 406 branches to step 408 to unmark the flag in the appropriate record, which then continues to step 422 for the next listed message, if any, as described below. Otherwise, the message is either a new one or one that is already tracked in the checked table, so step 406 branches to step 410 to look further for message state data.

At step 410, a lookup is performed on the checked table 328 to determine whether the message is known to have been previously downloaded but did not (and thus still cannot) meet the filtering criteria. If so, step 410 branches to step 412 to unmark its flag, because the message was listed by the server and thus not deleted at the server, and thus the record in the checked table is still relevant. Step 412 then continues to step 422 for the next listed message, if any, as described below.

If at step 410 the message is not in the checked table 410, (and was not in the message store via step 406), the message is one in an unknown state with respect to the filtering criteria. Thus, the message data (e.g., the appropriate two kilobytes) is downloaded at step 414, and the appropriate portion thereof evaluated against the filter criteria (e.g., the date window) at step 416. If the message meets the criteria, step 418 adds its data to the message store, and creates an appropriate entry in the message store table 326, with the flag unmarked so that it will not be removed from the table when any still-marked messages are removed.

If instead at step 416 the message does not meet the criteria, step 420 creates an appropriate entry in the checked table 328, again with the flag unmarked so that it will not be removed unless and until it is independently deleted at the server. Note that any time a record is created, the UID (and/or a corresponding hash value) is included in the record so that the record can be located against the UIDs on subsequent lists.

Steps 422 and 424 repeat the process for each UID in the list, until none remain. When none remain, step 426 is executed to remove any record in any table (and the message data if in the message store) that was not listed, and hence was deleted at the server. The flags that are marked indicate records that were deleted at the server since they were never listed, and thus were never unmarked via step 408 or step 412.

As can be seen from the foregoing detailed description, there is provided a method and system for downloading only a subset of the data maintained at a server for client-side filtering of that data. The method and system are particularly useful and efficient for processing POP3 message data, wherein the protocol does not facilitate server-side filtering. The present invention thus provides numerous advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing network comprised of a plurality of interconnected servers for transferring messages among the interconnected servers, and wherein at least some of the servers use a communication protocol that is not configured for communicating filtering information to the server, and wherein the computing network also comprises a plurality of client side computing devices for accessing the servers and downloading messages, a method of using client-side tracking mechanisms to allow a client side computing device to efficiently determine which messages need to be downloaded from the at least some servers for filtering at the client side computing device, so that essentially most of the filtering operations occur before the messages are downloaded, the method comprising:

setting at a client side computing device a filter criteria for new messages;

receiving at the client side computing device a list that identifies all messages maintained at least one server using a communication protocol that is not configured for communicating filtering information to the server;

retrieving at the client side computing device a message store table that contains records identifying each message which has previously met the filter criteria and has been placed in a message store, and marking each record with a flag;

retrieving at the client side computing device a checked table, the checked table comprising records identifying each message which has been checked against the filter criteria and has been found not to meet the filter criteria, and marking each record with a flag;

comparing the messages identified in the received list for all messages maintained at the at least one server with the records contained in the message store table and, for each message, determining if the message has already been placed in the message store;

comparing the messages identified in the received list for all messages maintained at the at least one server with the records contained in the checked table and, for each message, determining if the message is in the checked table, the checked table comprising records identifying messages having already been checked against the filter criteria and having been found not to meet the filter criteria;

then downloading to an inbox at the client side computing device all messages from the list that do not already correspond to a record in either the message store table or the checked table, so that download time is limited only to all new messages as determined from the message store table and the checked table;

unmarking the flags for all records contained in either the message store table or the checked table that already correspond to those messages identified in the list that have been previously identified in either of the tables;

checking all new messages downloaded against the filter criteria, and either adding a new unmarked record to the message store table if the filter criteria is met, or else adding a new unmarked record to the checked table if the filter criteria is not met; and removing any remaining records with marked flags in the message store table and the checked table.

2. A computer program product for use in a computing network comprised of a plurality of interconnected servers for transferring messages among the interconnected servers, and wherein at least some of the servers use a communication protocol that is not configured for communicating filtering information to the server, and wherein the computing network also comprises a plurality of client side computing devices for accessing the servers and downloading messages, the computer program product comprised of computer-executable instructions for implementing a method of using client-side tracking mechanisms to allow a client side computing device to efficiently determine which messages need to be downloaded from the at least some servers for filtering at the client side computing device, so that essentially most of the filtering operations occur before the messages are downloaded, and wherein the method implemented by computer program product's computer-executable instructions comprises the method of claim 1.

3. A method as defined in claims 1 or 2, wherein the client side computing device includes a plurality of application programs running on the client side computing device, and wherein one or more of the application programs may configured by a user to establish filtering criteria for message information handled by that particular application program.

4. A method as defined in claim 3 wherein the client side computing device includes a message store managing component which allows each of the application programs to store and retrieve stored messages for that application program.

5. A method as defined in claim 4 wherein the client side computing device includes a plurality of transports configured to receive and transmit different types of messages.

6. A method as defined in claim 5 wherein the messages may comprise any or all of the following kinds of messages: IMAP4, SMS, POP3, Active Sync, IM, and MMS.

7. The method of claim 1 wherein receiving the list that identifies the messages comprises issuing a UIDL command to a POP3 server and receiving a plurality of unique message identifiers in response.

8. The method of claim 1 wherein the filtering criteria comprises a time window.

9. The method of claim 2 wherein receiving the list that identifies the messages comprises issuing a UIDL command to a POP3 server.

* * * * *